United States Patent [19]
Yasuda et al.

[11] Patent Number: 5,923,639
[45] Date of Patent: Jul. 13, 1999

[54] PHASE-CHANGE OPTICAL RECORDING MEDIUM HAVING AN ADDITIVE RELATED TO THE WRITING LINE SPEED

[75] Inventors: Koichi Yasuda, Kanagawa; Osamu Kawakubo, Saitama, both of Japan

[73] Assignee: Sony Corporation, Tokyo, Japan

[21] Appl. No.: 08/936,554

[22] Filed: Sep. 24, 1997

[30] Foreign Application Priority Data

Sep. 26, 1996 [JP] Japan .................................... 8-254301

[51] Int. Cl.$^6$ ...................................................... G11B 7/24
[52] U.S. Cl. ...................... 369/275.2; 369/288; 428/64.4
[58] Field of Search ............................ 369/275.2, 275.1, 369/280, 284, 286, 287, 288; 428/64.4; 430/321

[56] References Cited

U.S. PATENT DOCUMENTS

| | | | |
|---|---|---|---|
| 4,841,515 | 6/1989 | James | 369/275.2 |
| 5,242,784 | 9/1993 | Chen et al. | 369/275.2 |
| 5,688,574 | 11/1997 | Tamura et al. | 428/64.1 |

*Primary Examiner*—Tan Dinh
*Attorney, Agent, or Firm*—Hill & Simpson

[57] ABSTRACT

An optical recording medium having a phase-changing material layer served as a recording layer is composed to excellently repeat the rewrite of bits independently of the line speed of the writing light. The amount of the additive to be added to the phase-changing material layer is regulated in relation to the line speed for the write. The additive is added for suppressing the crystallization.

22 Claims, 1 Drawing Sheet

PHASE-CHANGE OPTICAL RECORDING MEDIUM HAVING AN ADDITIVE RELATED TO THE WRITING LINE SPEED

BACKGROUND OF THE INVENTION

The present invention relates to an optical recording medium having a layer composed of a phase-changing material (referred to as a phase-changing material layer) served as a recording medium, and more particularly to the optical recording medium which enables to correspond to various line speeds.

In recent days, as a recordable optical disk, a phase-changing type optical disk has been proposed which contains a phase-changing material layer served as a recording one. As an example, this phase-changing type optical disk is formed to have a phase-changing material layer, a protective layer, and a reflective layer formed on a transparent substrate.

In this type of optical disk, the phase-changing material layer presents a crystalline state in its initial state. By applying writing light onto the phase-changing material layer, a minute area of the layer is changed into a liquid phase area. The movement of the writing light results in quenching the liquid phase area and thereby making the area non-crystalline, where pits are formed. The pits formed by non-crystallizing the area provide a lower reflective factor than the crystalline area. By detecting the difference of the reflective factor, it is reproduced as an information signal.

As this type of a recording system to an optical disk, a pit position recording system or a mark length recording system has been proposed. The pit position recording system is arranged to form a recording pit at a corresponding spot to data 1 of an original signal. Generally, this system is used because the formed pits are relatively stable.

On the other hand, the bit length recording system is arranged to form a recording pit in a manner to make an inverted spot of the data of the original signal, that is, the spot wherein data 0 is changed into data 1 or data 1 is changed into data 0 coincide with the edge position. This pit length recording system is more beneficial in light of density than the pit position recording system though the tail end of the pit may be different from the front end of the pit in some recording materials. From this beneficial point, this system is likely to use the phase-changing type optical disk.

By the way, various kinds of line speeds of the writing light given when writing the pits on the optical disk are set according to their way of uses. For example, for a compact disk, a line speed of 1.2 to 1.4 m/sec is set. For a digital video disk, a line speed of 4.0 m/sec is set. For an optical disk used for a camera, a relatively fast line speed of 6.0 to 14.0 m/sec is set. For these disks, the writing light is scanned at a constant line speed, while for the optical disks used for computers, the writing speed is scanned at a constant angular speed. In this case, the line speed of the writing light is progressively changed from the outer peripheral side to the inner peripheral side inside of the disk plane. The line speed of the outer peripheral side is 2.5 times as fast as that of the inner peripheral side.

In the phase-changing material layer, however, the quenching speed given after liquid-phasing has influence on the process of changing the phase. For example, if the line speed of the writing light is set to a slower one, the quenching speed is made slower, so that the formation of pits is made unstable.

That is, for forming non-crystalline minute areas (pits) on the phase-changing material layer, after the phase is changed into the liquid phase by applying the writing light, it is necessary to quickly cool down the liquid-phased area.

However, when the moving speed of the writing light is made slower, the heat is left in the liquid phased area. Hence, the liquid-phased area is not quenched after moving the writing light. In actual, the area is gradually cooled down. As a result, the area to be non-crystallized is re-crystallized, so that a predetermined pit form cannot be obtained. In particular, the pit length recording system is likely to have a longer pit length than the pit position recording system, so that the laser beam may be continuously applied onto the phase-changing material layer. In such a case, the heat is likely to be left in the phase-changing material layer, so that the layer is likely to be re-crystallized.

For overcoming this disadvantage, a trial has been made for adding an additive to the phase-changing material layer for suppressing the re-crystallization after the area is liquid-phased. If the additive is used, the addition amount is important. For example, if the amount of the additive is too great, it is difficult to crystallize the non-crystallized area when erasing the pits, unfavorably, the pits to be erased are left. Hence, it is necessary to use only the minimum necessary amount of the additive for suppressing the re-crystallization. In actual, however, the proper amount of additive is not sufficiently studied.

SUMMARY OF THE INVENTION

The present invention is made in consideration of the foregoing circumstances, and it is an object of the present invention to provide an optical recording medium which is formed to repetitively rewrite the pits even if the line speed of the writing light is set to any value.

In carrying out the object, according to an aspect of the invention, an optical recording medium is formed so that a phase-changing material layer having an additive added thereto, a protective layer, and a reflective layer are sequentially formed on a transparent substrate and the phase-changing material layer is liquid-phased by applying a laser beam and then is quenched for non-crystallizing the layer and is characterized in that the amount of the additive to be added to the phase-changing material layer is controlled according to the line speeds for writing.

According to another aspect of the invention, the additive is added to the phase-changing material layer for suppressing the crystallization. The amount of the additive is increased or decreased according to the line speed given in writing data. That is, if the line speed given in writing data is made faster, the amount of the additive is decreased, while if the line speed is made slower, the amount of the additive is increased.

As mentioned above, by controlling the amount of the additive according to the line speed, if the line speed of the writing light may be set to any value, the re-crystallization is suppressed in the process of quenching the liquid-phased area. The area not to be substantially non-crystallized is made positively non-crystalline. As a result, the excellent pits are formed. When erasing the pits, the area not to be non-crystallized is made positively crystalline, thereby suppressing the left amount of the pits to be erased. Hence, even if the mark length recording system is adopted, the excellent repetitive rewrite of the information signal can be obtained.

DESCRIPTION OF THE PREFERRED EMBODIMENTS

The description will be oriented to an embodiment of the present invention.

Figure 1:
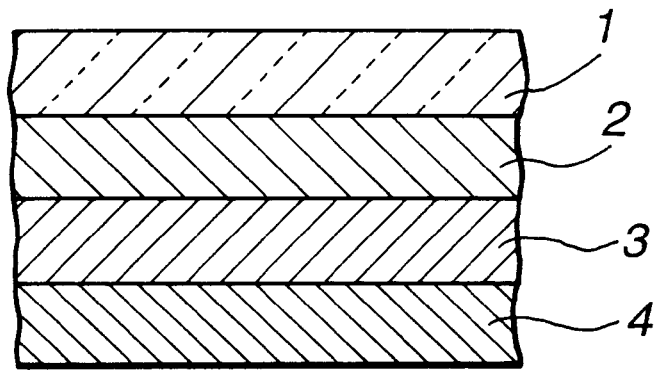
FIG. 1 is a schematic section showing a composition of an optical recording medium to which the present invention applies.

As shown in FIG. 1, the optical recording medium is composed of a transparent substrate 1, a phase-changing material layer 2, a protective layer 3, and a reflective layer 4. The layers 2, 3 and 4 are formed on one main plane of the transparent substrate 1 in the describing order.

The transparent substrate 1 may be made of a plastic material such as acrylic resin, polycarbonate resin, polyolefine resin or epoxy resin, or a glass material.

On the transparent substrate 1, if necessary, guide grooves and address pits for address information are formed as concaves and convexes on the transparent substrate 1 For forming these concaves and convexes, if the plastic material is used for the substrate material, the injection molding method with a stamper is employed. If the glass material is used therefor, the 2P (photo-polymerization) method is employed.

The phase-changing material layer 2 is served as a recording layer where an information signal is written. The phase-changing takes place between the crystalline state and the non-crystalline state. The additive is added to the phase-changing material whose reflective factor is changed by the phase-changing.

The phase-changing material may be a ternary alloy of Ge—Sb—Te, for example.

In particular, for the Ge—Sb—Te ternary alloy, the additive for suppressing the crystallization is an element to be substituted for Sb, for example, Au, Ag, Cu, Pt or Pd. In place, Sb, which is one component element of the alloy, may be used as the additive. That is, the Ge—Sb—Te ternary alloy is composed of GeTe and $Sb_2Te_3$ at a integer composition ratio. If an excessive amount of Sb is used for this composition, the SBb is pushed into the grain boundary, which inhibits the crystallization of the material.

The phase-changing material layer 2 keeps the crystalline state in the initial state. By applying the writing light (for example, a semiconductor laser having a wavelength of 680 to 690 nm), the minute area inside of the light spot is liquid-phased. By moving the writing light, the liquid-phased area is quenched for non-crystallizing. On the resulting area, a pit is formed. The non-crystallized pit has a lower reflective factor than the crystalline area. By detecting the difference of the reflective factor, the difference is reproduced as an information signal.

When the moving speed of the writing light is made slower and thus the quenching speed of the liquid-phased area is made slower, the area to be non-crystallized may be re-crystallized. Hence, the additive to be added to the phase-changing material layer is used for suppressing this re-crystallization.

According to the present invention, the amount of additive is regulated according to the line speed of the writing light.

For example, the optical disk arranged to keep the line speed constant (1.2 to 14.0 m/sec) is required to have the following amount of additive.
1. 2 m/sec: 3.5 to 4.0 atomic percent
1. 4 m/sec: 3.0 to 3.5 atomic percent
2. 4 m/sec: 2.5 to 3.0 atomic percent
2. 8 m/sec: 2.0 to 2.5 atomic percent
3. 6 m/sec: 1.5 to 2.0 atomic percent
4. 2 m/sec: 1.5 to 0.7 atomic percent
6. 0 m/sec: 0.7 to 0.8 atomic percent
7. 0 m/sec: 0.6 to 0.7 atomic percent
7. 2 m/sec: 0.5 to 0.6 atomic percent
8. 4 m/sec: 0.4 to 0.5 atomic percent
9. 6 m/sec: 0.3 to 0.4 atomic percent
11. 2 m/sec: 0.2 to 0.3 atomic percent
12. 0 m/sec: 0.1 to 0.2 atomic percent
14. 0 m/sec: 0.1 atomic percent or less Further, the optical disk arranged to keep the angular speed constant (line speed: 3.0 to 6.0 m/sec for the inner peripheral portion or 7.5 to 15.0 m/sec for the outer peripheral portion) is required to have the following amount of additive.

The inner peripheral portion 3.0 m/sec, the outer peripheral portion 7.5 m/sec: 1.6 to 2.4 atomic percent The inner peripheral portion 4.0 m/sec, the outer peripheral portion 10.0 m/sec: 1.0 to 1.6 atomic percent The inner peripheral portion 5.0 m/sec, the outer peripheral portion 12.5 m/sec: 0.8 to 1.0 atomic percent The inner peripheral portion 6.0 m/sec, the outer peripheral portion 15.0 m/sec: 0.8 atomic percent or less If the adding amount of the additive is smaller than the range, the effect on suppressing the crystallization is lacking. When writing the data, therefore, the re-quantization takes place in the process of quenching after liquid-phasing the area, so that the form of the pit is made unstable. If the adding amount of the additive is too great, when erasing the pit, it is difficult to crystallize the non-crystalline area, which may bring about the disadvantage of leaving the pits to be substantially erased.

By setting the adding amount of the additive and the line speed of the writing light in a manner to meet the foregoing conditions, the excellent repetitive rewrite of the information signal can be obtained.

On the phase-changing material layer 2 where this amount of additive is added, the protective layer 3 and the reflective layer 4 are formed.

The protective layer 3 is provided for protecting the phase-changing material layer 2 from moisture and the like of the ambient environment and increasing the signal modulation due to the multiple interference. This protective layer 3 is made of metal such as Al, Si or Zn, nitride, oxide, sulfide or carbide of a semiconductor element. It is desirous to select one of those materials whose absorption is small in the wavelength area of the writing light.

The reflective layer 4 is served to increase the signal modulation degree due to the multiple interference and as a heat sink layer. That is, the heat of the phase-changing material layer 2 is purged outside through this reflective layer 4, so that the left heat is reduced. This serves to suppress the re-crystallization appearing in the process of quenching after the liquid-phasing, which leads to stable formation of the pit. This reflective layer 4 is made of a metal having a high reflective factor, such as Dy, Al, Au, Ti or Cr. Al may contain the added metal of Ti, Cr or Si. Further, the reflective layer composed of such a metal may be used singularly or two or more layers may be composed. The thickness of this reflective layer 4 especially has an influence on the heat sinking effect. To sufficiently obtain this effect, the thickness may be preferably 60 to 200 nm.

Figure 2:
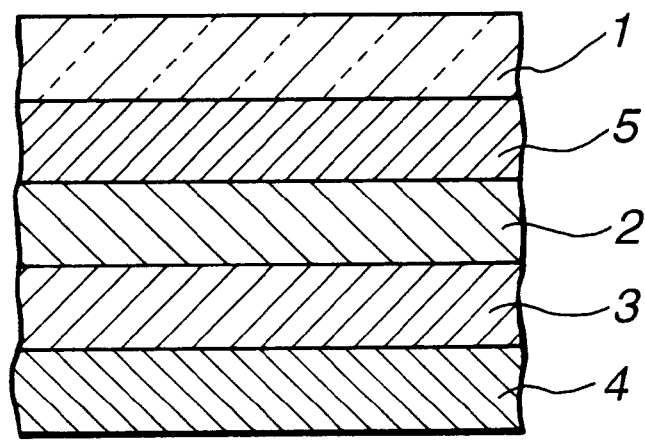
FIG. 2 is a schematic section showing another composition of an optical recording medium to which the present invention applies.

The optical recording medium according to the present invention has the foregoing basic composition. This optical recording medium may have an additional composition if necessary. For example, as shown in FIG. 2, a protective layer 5 is formed between the phase-changing material layer 2 and the transparent substrate 1. That is, the optical recording medium may take four-layered composition of the first protective layer 5, the phase-changing material layer 2, the second protective layer 3, and the reflective layer 4. Further, a third protective layer may be formed on the reflective layer 4. This third protective layer makes great contribution to enhancing the protecting effect of the phase change material layer 2 and increasing the signal modulation degree.

EXAMPLES

Later, the concrete embodiments of the present invention will be described on the basis of the experimental results.

Example 1

A transparent substrate is prepared in which guide grooves are formed by a photo-polymerization method. In this transparent substrate, a track pitch is 0.8 μm, the depth of the groove is about 60 nm, and the width W of the groove is 0.48 μm.

On the side of the transparent substrate where the guide grooves are formed, a first ZnS—SiO$_2$ protective layer whose thickness is 100 nm, a Pd$_4$Ge$_{22.2}$Sb$_{18.2}$Te$_{55.6}$ phase-changing material layer (additive Pd) whose thickness is 20 nm, and a second ZnS—SiO$_2$ protective layer whose thickness is 20 nm, and an Au reflective layer whose thickness is 60 nm are formed in the describing order, for manufacturing the optical disk. The composition of the ZnS—SiO$_2$ protective layer is a ZnS 80 weight and an SiO$_2$ 20 weight. The write is done on the optical disk at a constant line speed. The line speed is 1.2 m/sec.

Examples 2 to 4

The optical disks according to these embodiments are produced like the Example 1 except that the composition of the phase-changing material layer is changed into that as listed in Table 1. In addition, the write is done on this optical disk at a constant line speed. The line speed is listed in Table 1.

Comparative Example 1

The optical disk of the Comparative Example 1 is produced like the Example 1 except that Pd is not added to the phase-changing material layer. The write is done on this optical disk at a constant line speed. The line speed is listed in Table 1.

Comparative Example 2

The optical disk of the Comparative Example 2 is produced like the Example 1 except that the composition of the phase-changing material layer stays out of a predetermined range as listed in Table 1. The write is done on the optical disk at a constant line speed. The line speeds are listed in Table 1.

The characteristics of the optical disks produced as described above are evaluated by using a laser beam whose wavelength is 680 nm and focused through an eye lens having a numeric aperture of 0.55.

In the condition that the writing laser power is 7 mW, a random pattern is written by the (1.7) modulating system. In succession, in the condition that the reading laser power is 1 mW, the recording waveform is observed for measuring the fluctuation of the recording waveform.

Next, the written recording pattern is erased by the erasing laser whose power is 3.5 mW. Then, the random pattern is written again in the foregoing condition. This erasing/writing operation is repeated ten thousands times. Then, the recording waveform written at the ten-thousands-th time is observed for measuring the fluctuation. The fluctuation is measured by applying binary data and a clock regenerated by a PLL (Phase-Locked Loop) into a time interval analyzer (manufactured by Hewlette-Packard Company).

The measuring results of the fluctuation of the recording waveform are listed in Table 1. Table 1 also lists the compositions of the phase-changing material layer, the line speeds for the write, the signal frequencies, and the clock frequencies. If the fluctuation of the recording waveform exceeds 12.5%, the failure in reading the recording waveform is increased, which is likely to inhibit regeneration of the recording waveform. Hence, the point where the fluctuation exceeds 12.5% is a limit of repeating the write.

TABLE 1

| | Composition of phase-changing | Line Speed (m/Second) |
|---|---|---|
| Example 1 | Pd$_4$Ge$_{22.2}$Sb$_{18.2}$Te$_{55.6}$ | 1.2 |
| Example 2 | Pd$_{3.5}$Ge$_{22.2}$Sb$_{16.7}$Te$_{55.5}$ | 1.4 |
| Example 3 | Pd$_{3.0}$Ge$_{22.2}$Sb$_{19.2}$Te$_{55.6}$ | 2.4 |
| Example 4 | Pd$_{2.5}$Ge$_{22.2}$Sb$_{19.7}$Te$_{55.6}$ | 2.8 |
| Example 5 | Pd$_2$Ge$_{22}$Sb$_{18}$Te$_{56}$ | 3.6 |
| Example 6 | Pd$_{1.5}$Ge$_{22.2}$Sb$_{20.7}$Te$_{55.6}$ | 4.2 |
| Example 7 | Pd$_{0.8}$Ge$_{22.2}$Sb$_{21.4}$Te$_{55.6}$ | 6.0 |
| Example 8 | Pd$_{0.7}$Ge$_{22.2}$Sb$_{21.5}$Te$_{55.6}$ | 7.0 |
| Example 9 | Pd$_{0.6}$Ge$_{22.2}$Sb$_{21.6}$Te$_{55.6}$ | 7.2 |
| Example 10 | Pd$_{0.5}$Ge$_{22.2}$Sb$_{21.7}$Te$_{55.6}$ | 8.4 |
| Example 11 | Pd$_{0.4}$Ge$_{22.2}$Sb$_{21.8}$Te$_{55.6}$ | 9.6 |
| Example 12 | Pd$_{0.3}$Ge$_{22.2}$Sb$_{21.9}$Te$_{55.6}$ | 11.2 |
| Example 13 | Pd$_{0.2}$Ge$_{22.2}$Sb$_{22.0}$Te$_{55.6}$ | 12.0 |
| Example 14 | Pd$_{0.1}$Ge$_{22.2}$Sb$_{22.1}$Te$_{55.6}$ | 14.0 |
| Comparative Example 1 | Ge$_{22.2}$Sb$_{22.2}$Te$_{55.6}$ | 4.2 |
| Comparative Example 2 | Pd$_{1.0}$Ge$_{22.2}$Sb$_{21.2}$Te$_{55.6}$ | 6.0 |

| | Signal Frequency (MHz) | Clock Frequency (MHz) | Fluctuation of Recoding Waveform | |
|---|---|---|---|---|
| | | | Fist | 10,000-th |
| Example 1 | 0.57–2.26 | 4.52 | Less than 5% | Less than 12.5% |
| Example 2 | 0.66–2.64 | 5.28 | Less than 5% | Less than 12.5% |
| Example 3 | 1.13–4.53 | 9.06 | Less than 5% | Less than 12.5% |
| Example 4 | 1.13–4.53 | 9.06 | Less than 5% | Less than 12.5% |
| Example 5 | 1.70–6.79 | 13.58 | Less than 5% | Less than 12.5% |
| Example 6 | 1.98–7.92 | 15.85 | Less than 5% | Less than 12.5% |
| Example 7 | 2.85–11.30 | 22.60 | Less than 5% | Less than 12.5% |
| Example 8 | 3.30–13.20 | 26.40 | Less than 5% | Less than 12.5% |
| Example 9 | 3.42–13.56 | 27.12 | Less than 5% | Less than 12.5% |
| Example 10 | 3.96–15.84 | 31.68 | Less than 5% | Less than 12.5% |
| Example 11 | 4.56–18.08 | 36.16 | Less than 5% | Less than 12.5% |
| Example 12 | 1.70–6.79 | 13.58 | Less than 5% | Less than 12.5% |

TABLE 1-continued

| | | | | |
|---|---|---|---|---|
| Example 13 | 5.70–22.60 | 45.20 | Less than 5% | Less than 12.5% |
| Example 14 | 6.60–26.40 | 52.80 | Less than 5% | Less than 12.5% |
| Comparative Example 1 | 1.13–4.53 | 9.06 | Less than 5% | |
| Comparative Example 2 | 2.85–11.30 | 22.60 | Less than 5% | |

As listed in Table 1, for the optical disks of the Examples 1 to 14 arranged so that the adding amount of Pd to the phase-changing material layer and the line speed for the write meet with the predetermined conditions, the fluctuation of the recording waveform is suppressed to be less than 12.5% after the erasing/writing operation is repeated ten thousands times. After ten thousands or more erasing/writing operations, the recording waveform can be regenerated.

On the other hand, the optical disk of the Comparative Example 1 in which no additive is added to the phase-changing material layer and the optical disk of the Comparative Example 2 in which the adding amount of the additive stays out of the predetermined range indicate 12.5% or more fluctuation of the recording waveform when the erasing/writing operations are repeated one thousand times. As a result, the data cannot be generated from these optical disks.

In the optical disk where the data is written at a constant line speed, the abovementioned result has proved that the addition of the additive to the phase-changing material layer and the regulation of the adding amount in relation to the line speed for the write are effective in suppressing the fluctuation of the recording waveform appearing by repeating the writes.

Examples 15 to 22

The optical disks of the Examples 15 to 22 are produced like the Example 1 except that the compositions of the phase-changing material layer are changed as listed in Table 2. The write is done on these optical disks at a constant angular speed. The line speeds on the inner peripheral side and the outer peripheral side are listed in Table 2.

Comparative Example 3

The optical disk is produced like the Example 1 except that the composition of the phase-changing material layer stays out of the predetermined range as listed in Table 2.

For the optical disk produced as described above, the recording pattern is written. Then, the fluctuation of the recording pattern is measured. In succession, the erasing/writing operation is repeated ten thousands times. The fluctuation of the recording waveform of the recording pattern written at the ten-thousands-th time was measured. The results are listed in Table 3. The writing power, the erasing power, the reading power and the modulating system are the same as those as described above. The line speeds for the write, the signal frequencies and the clock frequencies are listed in Table 2.

TABLE 2

| | | Line Speed (m/Second) | |
|---|---|---|---|
| | Composition of phase-changing | Inner Peripheral Portion | Outer Peripheral Portion |
| Example 15 | $Pd_{2.4}Ge_{22.2}Sb_{19.8}Te_{55.6}$ | 3.0 | 7.5 |
| Example 16 | $Pd_{0.7}Ge_{22.2}Sb_{21.5}Te_{55.6}$ | 6.0 | 15.0 |
| Example 17 | $Pd_{0.6}Ge_{22.2}Sb_{21.6}Te_{55.6}$ | 6.0 | 15.0 |
| Example 18 | $Pd_{0.5}Ge_{22.2}Sb_{21.7}Te_{55.6}$ | 6.0 | 15.0 |
| Example 19 | $Pd_{0.4}Ge_{22.2}Sb_{21.8}Te_{55.6}$ | 6.0 | 15.0 |
| Example 20 | $Pd_{0.3}Ge_{22.2}Sb_{21.9}Te_{55.6}$ | 6.0 | 15.0 |
| Example 21 | $Pd_{0.2}Ge_{22.2}Sb_{22.0}Te_{55.6}$ | 6.0 | 15.0 |
| Example 22 | $Pd_{0.1}Ge_{22.2}Sb_{22.1}Te_{55.6}$ | 6.0 | 15.0 |
| Comparative Example 3 | $Pd_{1.0}Ge_{22.2}Sb_{21.2}Te_{55.6}$ | 5.0 | 12.5 |

| | Signal Frequency (MHz) | Clock Frequency (MHz) |
|---|---|---|
| Example 15 | 2.85–11.30 | 22.60 |
| Example 16 | 3.30–13.20 | 26.40 |
| Example 17 | 3.42–13.56 | 27.12 |
| Example 18 | 3.96–15.84 | 31.68 |
| Example 19 | 4.56–18.08 | 36.16 |
| Example 20 | 1.70–6.79 | 13.58 |
| Example 21 | 5.70–22.60 | 45.20 |
| Example 22 | 6.60–26.40 | 52.80 |
| Comparative Example 3 | 2.85–11.30 | 22.60 |

TABLE 3

| | Fluctuation of Recoding Waveform | | | |
|---|---|---|---|---|
| | Fist | | 10,000-th | |
| | Inner Peripheral Portion | Outer Peripheral Portion | Inner Peripheral Portion | Outer Peripheral Portion |
| Example 15 | Less than 7% | Less than 7% | Less than 12.5% | Less than 12.5% |
| Example 16 | Less than 7% | Less than 7% | Less than 12.5% | Less than 12.5% |
| Example 17 | Less than 7% | Less than 7% | Less than 12.5% | Less than 12.5% |
| Example 18 | Less than 7% | Less than 7% | Less than 12.5% | Less than 12.5% |
| Example 19 | Less than 7% | Less than 7% | Less than 12.5% | Less than 12.5% |
| Example 20 | Less than 7% | Less than 7% | Less than 12.5% | Less than 12.5% |
| Example 21 | Less than 7% | Less than 7% | Less than 12.5% | Less than 12.5% |
| Example 22 | Less than 7% | Less than 7% | Less than 12.5% | Less than 12.5% |
| Comparative Example 3 | Less than 7% | Less than 7% | — | — |

As listed in Table 3, for the optical disks of the Examples 15 to 22 arranged so that the adding amount of Pd to the phase-changing material layer and the line speeds for the write meet with the predetermined conditions, it has proved that the fluctuation of the recording waveform is suppressed to be 12.5% or less after the erasing/writing operation is repeated ten thousands times and the optical disks can be reproducible even after ten thousands or more erasing/writing operations.

On the other hand, the optical disk of the Comparative Example 3 in which the adding amount of the additive stays out of the predetermined range indicates 12.5% or more fluctuation of the recording waveform when ten thousands erasing/writing operations are repeated. As a result, the optical disk cannot be reproduced.

For the optical disk on which the data is written at a constant angular speed, the abovementioned result has proved that the addition of the additive to the phase-changing material layer and the regulation of the adding amount of the additive in relation to the line speed for the write are effective in suppressing the fluctuation of the recording waveform appearing by repeating the write.

As is obvious from the foregoing description, the optical disk of the present invention is arranged to regulate the adding amount of the additive to the phase-changing material layer in relation to the line speed for the write. Hence, even if the line speed is set to any value, the optical disk enables to excellently repeat the rewrite of the information signal. It means that the optical disk may apply to a system having a relatively slow line speed such as a CD system or a DVD system or a system having a relatively fast line speed such as a camera. Further, the write is done at a constant line speed. However, the optical disk may be used as a disk for computers in which the write is done at a constant angular speed. It means that the optical disk is quite practical.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical recording medium comprising:
   a transparent substrate;
   a phase-changing material layer having an additive added thereto and formed on said transparent substrate;
   a protective layer formed on said phase-changing material layer;
   a reflective layer formed on said protective layer;
   said phase-changing material layer transformed to a liquid phase by applying a laser beam onto said layer and to a non-crystalline state upon quenching, and
   wherein said additive is present in an amount related to a selected write line speed, said additive being present in an amount is less than or equal to 4.0 atomic percent, said write line speed is greater than or equal to 1.2 m/sec.

2. The optical recording medium as claimed in claim 1, wherein data is to be written at a constant line speed of 1.2 m/sec and the amount of said additive added to said phase-changing material layer is 3.5 to 4.0 atomic percent.

3. The optical recording medium as claimed in claim 1, wherein data is to be written at a constant line speed of 1.4 m/sec and the amount of said additive added to said phase-changing material layer is 3.0 to 3.5 atomic percent.

4. The optical recording medium as claimed in claim 1, wherein data is to be written at a constant line speed of 2.4 m/sec and the amount of said additive added to said phase-changing material layer is 2.5 to 3.0 atomic percent.

5. The optical recording medium as claimed in claim 1, wherein data is to be written at a constant line speed of 2.8 m/sec and the amount of said additive added to said phase-changing material layer is 2.0 to 2.5 atomic percent.

6. The optical recording medium as claimed in claim 1, wherein data is to be written at a constant line speed of 3.6 m/sec and the amount of said additive added to said phase-changing material layer is 1.5 to 2.0 atomic percent.

7. The optical recording medium as claimed in claim 1, wherein data is to be written at a constant line speed of 4.2 m/sec and the amount of said additive added to said phase-changing material layer is 1.5 atomic percent or less.

8. The optical recording medium as claimed in claim 1, wherein data is to be written at a constant line speed of 6.0 m/sec and the amount of said additive added to said phase-changing material layer is 0.7 to 0.8 atomic percent.

9. The optical recording medium as claimed in claim 1, wherein data is to be written at a constant line speed of 7.0 m/sec and the amount of said additive added to said phase-changing material layer is 0.6 to 0.7 atomic percent.

10. The optical recording medium as claimed in claim 1, wherein data is to be written at a constant line speed of 7.2 m/sec and the amount of said additive added to said phase-changing material layer is 0.5 to 0.6 atomic percent.

11. The optical recording medium as claimed in claim 1, wherein data is to be written at a constant line speed of 8.4 m/sec and the amount of said additive added to said phase-changing material layer is 0.4 to 0.5 atomic percent.

12. The optical recording medium as claimed in claim 1, wherein data is to be written at a constant line speed of 9.6 m/sec and the amount of said additive added to said phase-changing material layer is 0.3 to 0.4 atomic percent.

13. The optical recording medium as claimed in claim 1, wherein data is to be written at a constant line speed of 11.2 m/sec and the amount of said additive added to said phase-changing material layer is 0.2 to 0.3 atomic percent.

14. The optical recording medium as claimed in claim 1, wherein data is to be written at a constant line speed of 12.0 m/sec and the amount of said additive added to said phase-changing material layer is 0.1 to 0.2 atomic percent.

15. The optical recording medium as claimed in claim 1, wherein data is to be written at a constant line speed of 14.0 m/sec and the amount of said additive added to said phase-changing material layer is 0.1 atomic percent or less.

16. The optical recording medium as claimed in claim 1, wherein data is to be written at a constant angular speed and line speed of 3.0 to 7.5 m/sec and the amount of said additive added to said phase-changing material layer is 1.6 to 2.4 atomic percent.

17. The optical recording medium as claimed in claim 1, wherein data is to be written at a constant angular speed and line speed of 4.0 to 10.0 m/sec and the amount of said additive added to said phase-changing material layer is 1.0 to 1.6 atomic percent.

18. The optical recording medium as claimed in claim 1, wherein data is to be written at a constant angular speed and line speed of 5.0 to 12.5 m/sec and the amount of said additive added to said phase-changing material layer is 0.8 to 1.0 atomic percent.

19. The optical recording medium as claimed in claim 1, wherein data is to be written at a constant angular speed and line speed of 6.0 to 15.0 m/sec and the amount of said additive added to said phase-changing material layer is 0.8 atomic percent or less.

20. The optical recording medium as claimed in claim 1, wherein said phase-changing material layer is composed of a Ge—Sb—Te ternary alloy and an additive added thereto.

21. The optical recording medium as claimed in claim 20, wherein said additive to be added to said phase-changing material layer is Au, Ag, Cu, Pt, Pd or Sb.

22. The optical recording medium as claimed in claim 1, wherein the laser has a wavelength of 680 to 690 nm.

* * * * *